(12) United States Patent
Costello

(10) Patent No.: US 7,194,932 B1
(45) Date of Patent: Mar. 27, 2007

(54) TRANSMISSION CASE ADAPTOR

(76) Inventor: Scott D. Costello, 609 Costello Rd., Oak Grove, LA (US) 71263

( * ) Notice: Subject to any disclaimer, the term of this patent is extended or adjusted under 35 U.S.C. 154(b) by 210 days.

(21) Appl. No.: 10/441,690

(22) Filed: May 20, 2003

(51) Int. Cl.
*F16H 57/02* (2006.01)

(52) U.S. Cl. .................................. 74/606 R

(58) Field of Classification Search ............ 74/606 R, 74/421 A
See application file for complete search history.

(56) References Cited

U.S. PATENT DOCUMENTS

| | | | |
|---|---|---|---|
| 3,382,735 A | 5/1968 | Gatiss | ......................... 74/730 |
| 4,037,429 A | 7/1977 | Britzius | ........................... 64/4 |
| 4,641,547 A | 2/1987 | Stich et al. | .................... 74/606 |
| 4,744,436 A | 5/1988 | Vchiyama | ................... 180/233 |
| 5,022,478 A | 6/1991 | Hartmann | .................. 180/53.1 |
| 5,267,488 A * | 12/1993 | Hardeman et al. | ........ 74/606 R |
| 5,311,787 A | 5/1994 | Wilson et al. | ............. 74/15.88 |
| 5,967,930 A | 10/1999 | Ahluwalia | |
| 6,125,717 A * | 10/2000 | Phillips | .................... 74/606 R |

\* cited by examiner

*Primary Examiner*—Vicky A. Johnson
(74) *Attorney, Agent, or Firm*—R. Keith Harrison

(57) ABSTRACT

An adaptor which is suitable for attaching a powerglide transmission case to a four-wheel-drive transfer case in vehicles. The adaptor includes an adaptor body having a transmission case attachment collar on one end for attachment to the powerglide transmission case and a transfer case attachment collar on the opposite end for attachment to the four-wheel-drive transfer case. A shaft opening extending through the adaptor body receives a transfer shaft that connects the gear mechanism of the powerglide transmission to the gear mechanism of the four-wheel-drive transfer mechanism. Fastener openings in the transmission case attachment collar and fastener recesses in the transfer case attachment collar receive fasteners which are extended through respective fastener openings in the powerglide transmission case and the transfer case, respectively.

20 Claims, 4 Drawing Sheets

TRANSMISSION CASE ADAPTOR

FIELD OF THE INVENTION

The present invention relates to transmission cases for housing vehicle transmission systems. More particularly, the present invention relates to a transmission case adaptor for attaching a drag-racing style powerglide transmission case to a four-wheel drive transfer case used in mud racing vehicles.

The sport of drag racing has enjoyed tremendous popularity over the years. According to official rules, drag racing cars are accelerated from a standing start to a finish line, typically over a distance of ⅛ or ¼ mile, in the shortest possible time. In order to achieve the shortest possible time to traverse the drag racing distance, a driver must leave the starting line with the engine operating at an optimum RPM level and successively shift from lower to higher gears each time the engine reaches higher RPM levels. Because the difference between winning and losing a race is often measured in thousandths of a second, it is necessary that the car's transmission operate in a quick and smooth fashion.

Drag racing cars are typically equipped with a conventional two-wheel-drive transmission, which transmits torque from the car's engine to the car's rear wheels. Typically, the car includes two forward gears and one reverse gear. The powerglide transmission has been used to transfer the engine's rotary power from the engine to a two-wheel drive vehicle via a drive shaft. It has been found that a four-wheel drive mechanism, by which engine rotary power is transferred to both the front and rear wheels, confers significant performance benefits on mud racing vehicles through the use of a powerglide transmission. However, an adaptor is needed to attach the powerglide transmission case to the four wheel drive transfer case in such four-wheel-drive powerglide transmission applications.

Various transmissions and transmission adaptors are known in the art. Patents of interest in this regard include U.S. Pat. Nos. 3,382,735; 4,037,429; 4,641,547; 4,744,436; 5,022,478; 5,311,787; and 5,967,930.

SUMMARY OF THE INVENTION

The present invention is generally directed to an adaptor which is suitable for attaching a drag-racing style powerglide transmission case to a four-wheel-drive transfer case in vehicles, particularly vehicles used for mud racing. The adaptor includes an adaptor body having a transmission case attachment collar on one end for attachment to the powerglide transmission case and a transfer case attachment collar on the opposite end for attachment to the four-wheel-drive transfer case. A shaft opening extending through the adaptor body receives a transfer shaft that connects the gear mechanism of the powerglide transmission to the gear mechanism of the four-wheel-drive transfer mechanism. Fastener openings in the transmission case attachment collar and fastener recesses in the transfer case attachment collar receive fasteners which are extended through respective fastener openings in the powerglide transmission case and the transfer case, respectively.

BRIEF DESCRIPTION OF THE DRAWINGS

The invention will be better understood, by way of example, with reference to the accompanying drawings, in which.

DESCRIPTION OF THE PREFERRED EMBODIMENTS

The present invention has particularly beneficial utility in attaching a drag-racing style powerglide transmission case to a four-wheel-drive transfer case in mud racing vehicle applications. However, it will be recognized by those skilled in the art that the present invention may be equally applicable to attaching a powerglide transmission case to a four-wheel-drive transfer case in other types of motorized vehicles.

Figure 1:
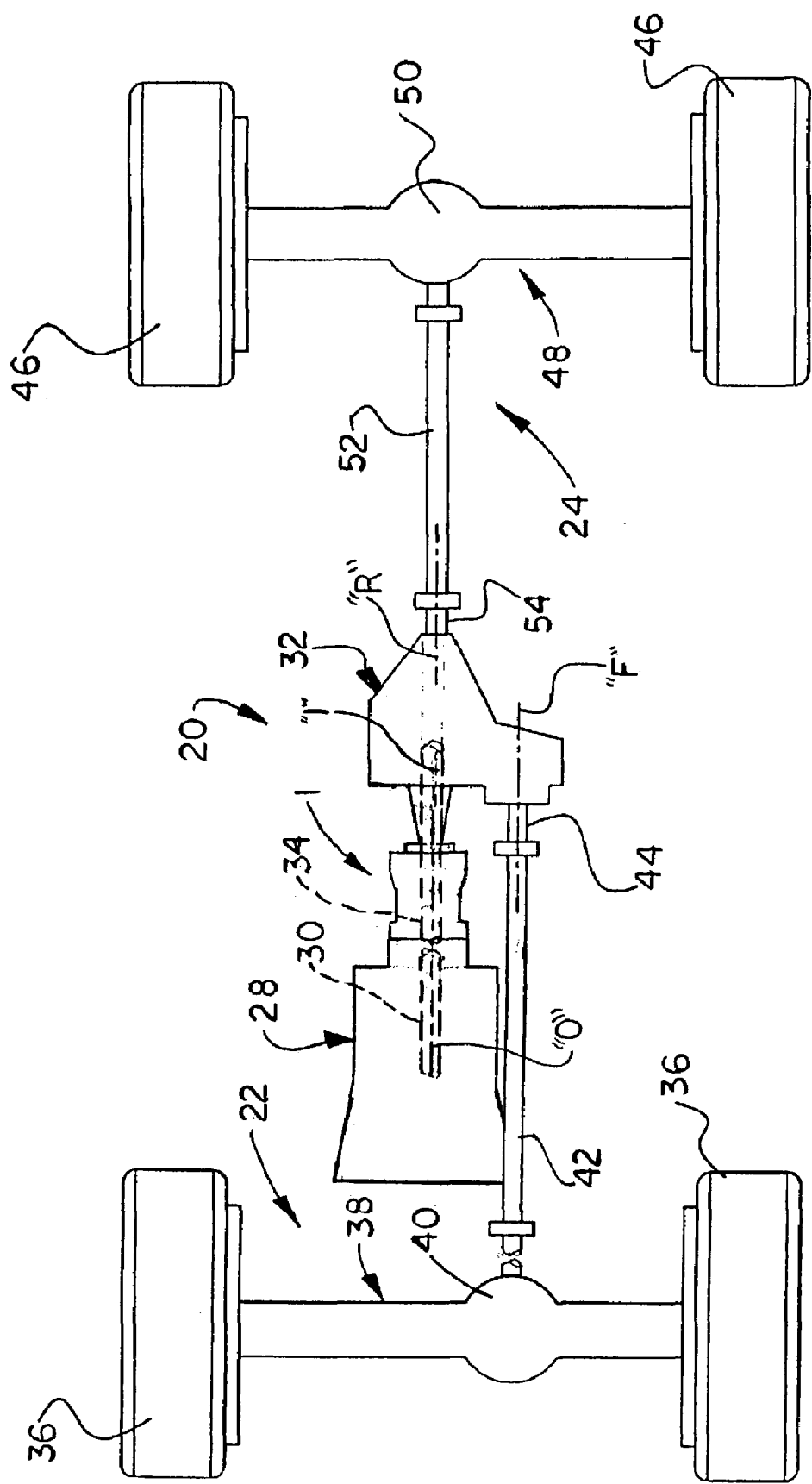
FIG. 1 is a bottom schematic view of a transmission system of an automobile, with an illustrative embodiment of the transmission case adaptor of the present invention connecting a powerglide transmission case to a four-wheel-drive transfer case.

Referring initially to FIG. 1, a power transfer system which is suitable for implementation of the transmission case adaptor of the present invention is generally indicated by reference numeral 20. The power transfer system 20 includes a front driveline 22 and a rear driveline 24, both of which are drivingly engaged by an engine (not shown) through a powerglide transmission mechanism (not shown), contained inside a powerglide transmission case 28, and a four-wheel-drive transfer mechanism (not shown), contained inside a transfer case 32. The powerglide transmission case 28 and the transfer case 32, as well as the powerglide transmission mechanism housed in the powerglide transmission case 28 and the four-wheel-drive transfer mechanism housed in the transfer case 32, are conventional and well-known by those skilled in the art. A transmission case adaptor 1 of the present invention, the structural details of which will be hereinafter described, attaches the powerglide transmission case 28 to the transfer case 32. The powerglide transmission mechanism inside the powerglide transmission case 28 includes an output shaft 30 that is supported for rotation about a rotary axis "O" and transmits drive torque to a transfer shaft 34 that extends through the transmission case adaptor 1. The transfer shaft 34, in turn, transmits drive torque to the four-wheel-drive transfer mechanism inside the transfer case 32. The four-wheel-drive transfer mechanism in the transfer case 32 transmits drive torque to the front driveline 22 through a front output shaft 44 and to the rear driveline 24 through a rear output shaft 54.

The front driveline 22 includes a pair of front wheels 36 connected at opposite ends of a front axle assembly 38 which is coupled by a differential 40 to one end of a front prop shaft 42, the opposite end of which is coupled to the front output shaft 44 of the transfer case 32. The front output shaft 44 is supported in the transfer case 32 for rotation about a rotary axis "F". The rear driveline 24 includes a pair of rear wheels 46 connected at opposite ends to a rear axle assembly 48 which is coupled by a differential 50 to one end of a rear prop shaft 52, the opposite end of which is coupled to the rear output shaft 54 of the transfer case 32. The rear output shaft 54 is supported in the transfer case 32 for rotation about a rotary axis "R" which is commonly aligned with a rotary axis "T" of the transfer shaft 34.

Referring next to FIGS. 4–9 of the drawings, the transmission case adaptor 1 of the present invention includes an adaptor body 2 which is typically aluminum or steel and includes a generally cylindrical middle body portion 3. A shaft bore 7 extends centrally through the adaptor body 2. A transmission case attachment collar 4 which may be cylindrical is provided in one end of the middle body portion 3, and a transfer case attachment collar 10 which is typically cylindrical is provided in the opposite end of the middle body portion 3. An annular body taper 14 typically extends between the outer surface of the transfer case attachment collar 10 and the outer surface of the middle body portion 3.

Figure 6:
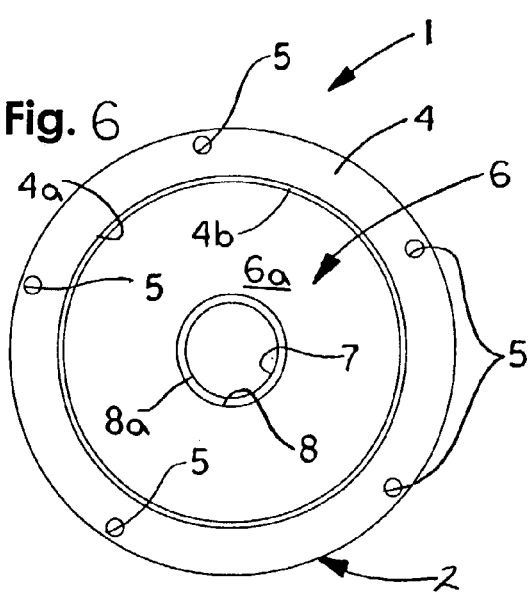
FIG. 6 is a front view of the transmission case adaptor.
Figure 7:
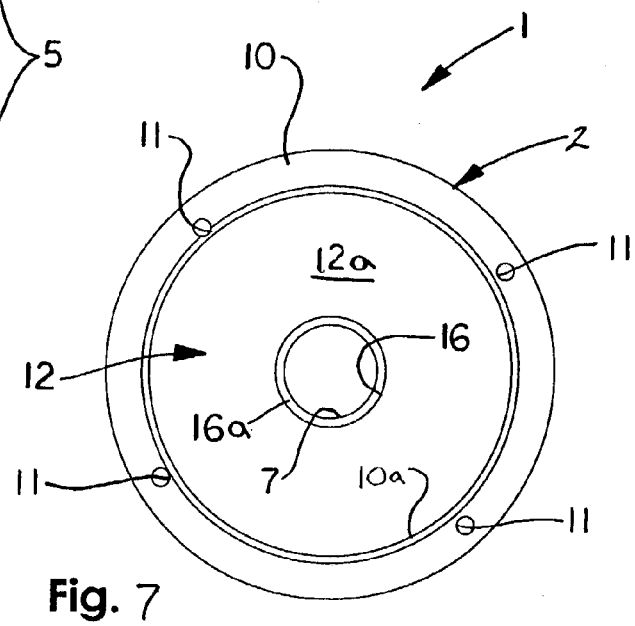
FIG. 7 is a rear view of the transmission case adaptor.
Figure 8:
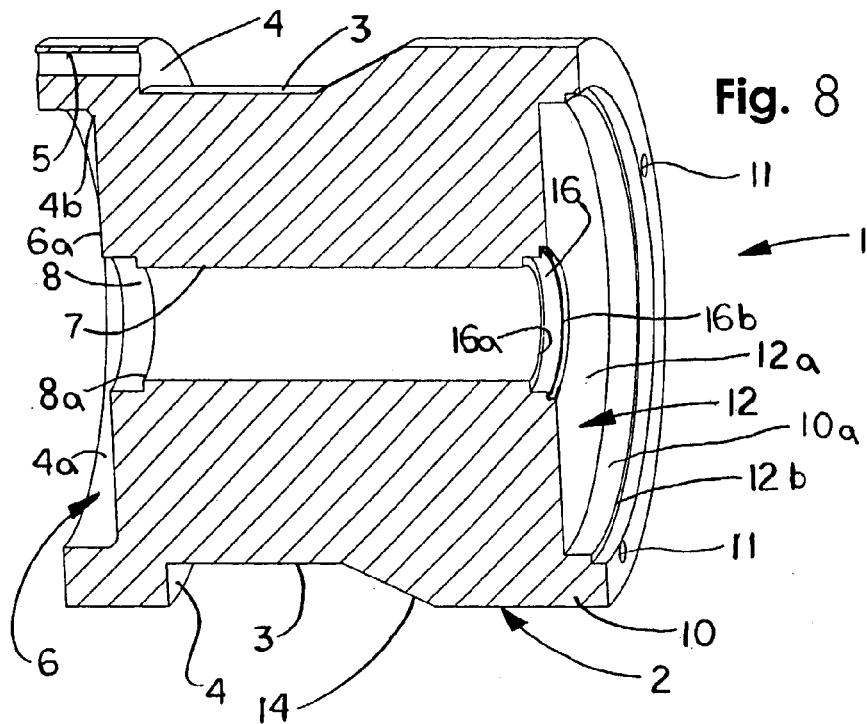
FIG. 8 is a longitudinal sectional and rear perspective view of the transmission case adaptor.
Figure 9:
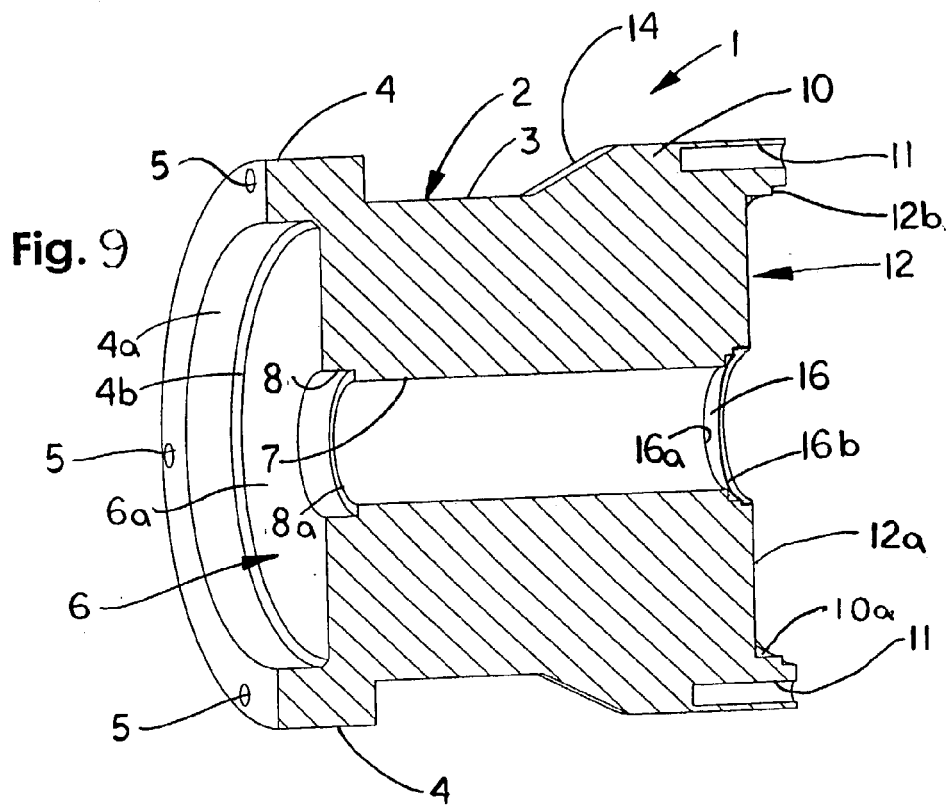
FIG. 9 is a longitudinal sectional and front perspective view of the transmission case adaptor.

As shown in FIG. 8, each of multiple fastener openings 5 extends completely through the transmission case attachment collar 4. Each of the fastener openings 5 has a longitudinal axis which is typically parallel to the longitudinal axis of the shaft bore 7, and the interior wall of each of the fastener openings 5 is typically smooth or unthreaded. In a preferred embodiment, five fastener openings 5 extend through the transmission case attachment collar 4, as shown in FIG. 6. As shown in FIG. 9, each of multiple fastener recesses 11 extends partially into the transfer case attachment collar 10. Like each of the fastener openings 5, each of the fastener recesses 111 has a longitudinal axis which is typically parallel to the longitudinal axis of the shaft bore 7. Each of the fastener recesses 11 is typically closed-ended and the interior wall of each of the fastener recesses 11 is typically threaded. In a preferred embodiment, four fastener recesses 11 are provided in the transfer case attachment collar 10, as shown in FIG. 7.

As shown in FIGS. 6 and 9, the transmission case attachment collar 4 has an annular inner collar wall 4a that defines a shaft bearing cavity 6 which communicates with the shaft bore 7. An inner cavity wall 6a is recessed in the shaft bearing cavity 6. An annular cavity bevel 4b typically extends between the inner collar wall 4a and the inner cavity wall 6a and circumscribes the inner cavity wall 6a. As shown in FIG. 6, the shaft bearing cavity 6 is substantially concentric with the shaft bore 7. As shown in FIG. 9, a flange cavity 8 having a cavity shoulder 8a is provided in the inner cavity wall 6a, where the shaft bore 7 joins the shaft bearing cavity 6.

As shown in FIGS. 7 and 8, the transmission case attachment collar 10 has an annular inner collar wall 10a that defines a shaft bearing cavity 12 which communicates with the shaft bore 7. An inner cavity wall 12a is recessed in the shaft bearing cavity 12. An annular cavity shoulder 12b is typically provided in the inner collar wall 10a. As shown in FIG. 7, the shaft bearing cavity 12 is substantially concentric with the shaft bore 7. As shown in FIG. 8, a flange cavity 16 having an interior cavity shoulder 16a is provided in the inner cavity wall 12a, where the shaft bore 7 joins the shaft bearing cavity 12. An annular exterior cavity shoulder 16b may be further provided in the inner cavity wall 12a, in concentric relationship to the shaft bore 7 and the interior cavity shoulder 16a.

Figure 2:
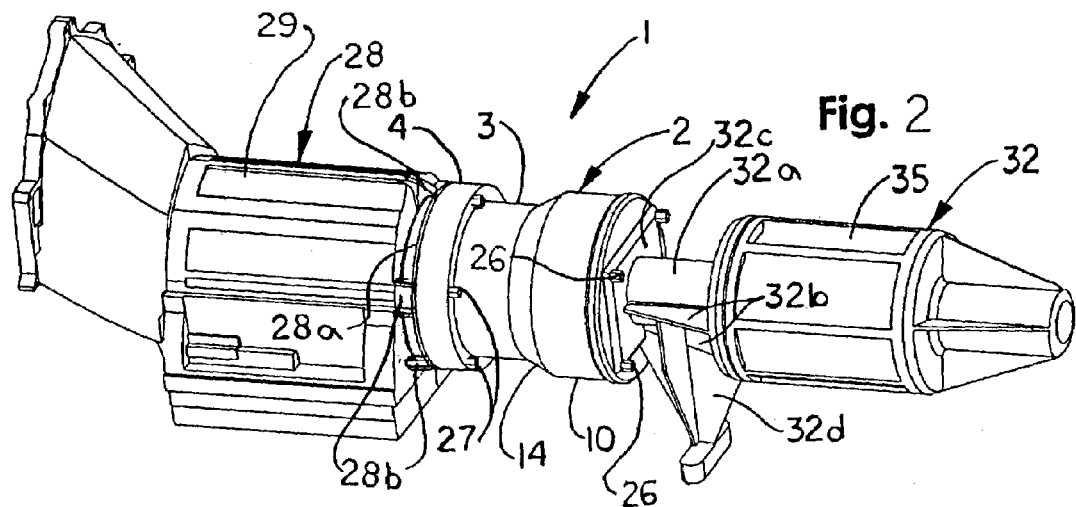
FIG. 2 is a perspective view of a powerglide transmission case connected to a four-wheel-drive transfer case via the transmission case adaptor of the present invention.
Figure 3:
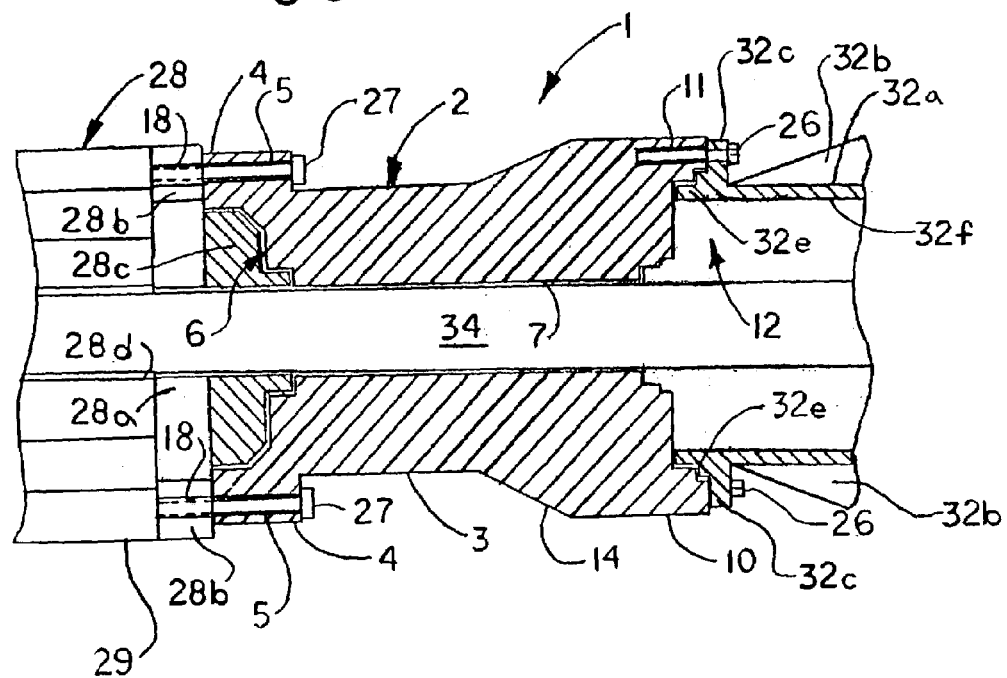
FIG. 3 is a longitudinal sectional view of the transmission case adaptor connecting a powerglide transmission case (partially in section) to a four-wheel-drive transfer case (partially in section)
Figure 4:
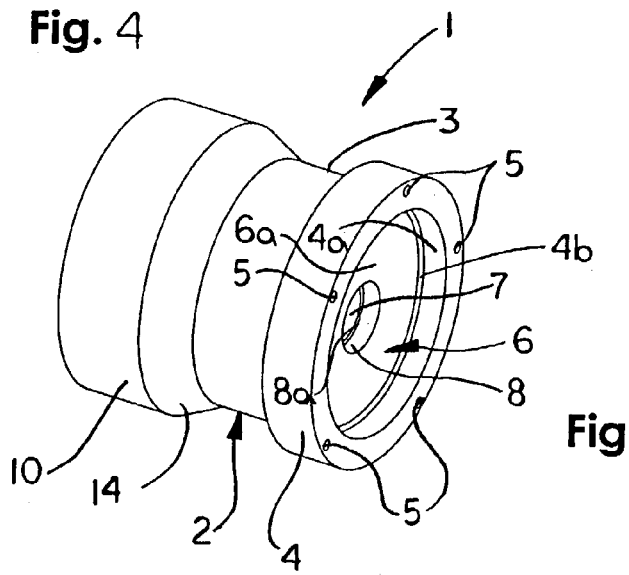
FIG. 4 is a front perspective view of an illustrative embodiment of the transmission case adaptor.
Figure 5:
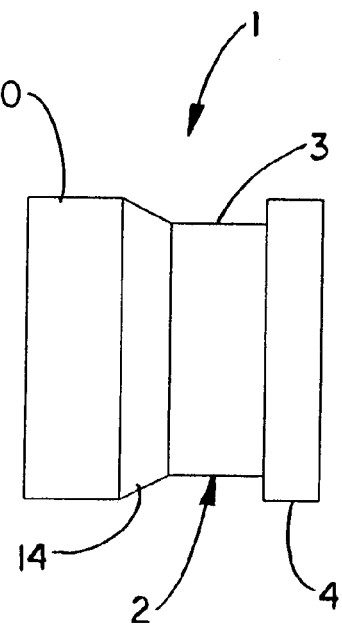
FIG. 5 is a side view of the transmission case adaptor.

Referring next to FIGS. 2 and 3, in typical application the transmission case adaptor 1 attaches the conventional powerglide transmission case 28 to the conventional four-wheel-drive transfer case 32 as follows. The powerglide transmission case 28 includes a case housing 29 having an annular mount collar 28a which is provided with multiple, spaced-apart fastener ribs 28b. Typically, the mount collar 28a includes five fastener ribs 28b, each of which is provided with an interiorly-threaded transmission case fastener opening 18 as shown in FIG. 3. A shaft bearing 28c (FIG. 3) extends from the inner face of the mount collar 28a, and a central shaft bore 28d extends through the mount collar 28a and into the case housing 29. The transfer case 32 includes a transfer case housing 35 which houses the four-wheel-drive gear mechanism (not shown) and from which extends a shaft housing 32a that is typically bolted to the transfer case housing 35. A typically rectangular flange 32c is provided on the extending end of the shaft housing 32a. Multiple gussets 32b may be provided for reinforcing the shaft housing 32a on the case housing 35. A mount flange 32d extends from the shaft housing 32a to facilitate mounting the transfer case 32 on the frame (not shown) of the automobile, in conventional fashion. As shown in FIG. 3, a flange collar 32e, which may have a stepped cross-section, as shown, extends from the inner face of the flange 32c. A shaft bore 32f extends through the flange collar 32e and shaft housing 32a, and communicates with the transfer case housing 35 of the transfer case 32.

The transmission case adaptor 1 is attached to the powerglide transmission case 28, as shown in FIG. 2, by initially inserting the shaft bearing 28c on the inner face of the mount collar 28a of the powerglide transmission case 28 into the complementary-shaped shaft bearing cavity 6 of the adaptor body 2, with the fastener openings 5 of the transmission case attachment collar 4 on the transmission case adaptor 1 registering with the respective transmission case fastener openings 18 in the fastener ribs 28b of the powerglide transmssion case 28. Multiple transmission case adaptor fasteners 27 are then extended through the respective fastener openings 5 in the transmission case attachment collar 4 and then threaded into the respective transmission case fastener openings 18 in the fastener ribs 28b of the powerglide transmission case 28. The transmission case adaptor 1 is attached to the transfer case 32 by initially inserting the flange collar 32e on the inner face of the flange 32c on the shaft housing 32a attached to the transfer case 32 into the complementary-shaped shaft bearing cavity 12 of the adaptor body 2, with the fastener recesses 11 in the transfer case attachment collar 10 registering with respective fastener openings (not shown) provided in the flange 32c. Transfer case fasteners 26 are then extended through the fastener openings (not shown) provided in the flange 32c and threaded into the respective fastener recesses 11.

The transfer shaft 34 operably connects the powerglide transmission gear mechanism (not shown) inside the powerglide transmission case 28 to the four-wheel-drive transfer gear mechanism (not shown) provided inside the transfer case 32, to transmit rotation from the powerglide transmission gear mechanism to the four-wheel-drive transfer gear mechanism. The powerglide transmission gear mechanism and the four-wheel-drive transfer gear mechanism may be conventional. Accordingly, the transfer shaft 34 extends from the powerglide transmission case 28 through the shaft bore 28d of the mount collar 28a, the shaft bearing 28c, the shaft bore 7 of the adaptor body 2, the flange collar 32e, and through the shaft bore 32f of the shaft housing 32a and into the transfer case housing 35 of the transfer case 32. The transmission case adaptor 1 is thus operable to secure the powerglide transmission case 28 to the transfer case 32 while permitting transfer of torque from the powerglide transmission to the four-wheel-drive transfer mechanism of the automobile. In drag racing applications, this arrangement provides smooth transition between lower and higher gears while facilitating driving rotation to the rear wheels of the drag racing car, significantly enhancing the performance characteristics of the car.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. An adaptor for attaching a powerglide transmission case to a four-wheel-drive transfer case, comprising:
    an adaptor body having a continuous shaft bore extending through said adaptor body;
    a transmission case attachment collar provided on a first end of said adaptor body;
    a first set of fastener apertures provided in said transmission case attachment collar;
    a transfer case attachment collar provided on a second end of said adaptor body;
    a second set of fastener apertures provided in said transfer case attachment collar; and
    wherein said adaptor body, said transmission case attachment collar and said transfer case attachment collar are formed in one piece.

2. The adaptor of claim 1 further comprising a shaft bearing cavity provided in said first end of said adaptor body.

3. The adaptor of claim 2 further comprising a second shaft bearing cavity provided in said second end of said adaptor body.

4. The adaptor of claim 1 wherein said adaptor body comprises a generally cylindrical middle body portion and wherein said transmission case attachment collar is provided on a first end of said middle body portion and said transfer case attachment collar is provided on a second end of said middle body portion.

5. The adaptor of claim 4 further comprising a shaft bearing cavity defined by said transmission case attachment collar.

6. The adaptor of claim 3 wherein said adaptor body comprises a generally cylindrical middle body portion and wherein said transmission case attachment collar is provided on a first end of said middle body portion and said transfer case attachment collar is provided on a second end of said middle body portion.

7. The adaptor of claim 1 wherein said first set of fastener apertures comprises a plurality of fastener openings extending through said transmission case attachment collar and said second set of fastener apertures comprises a plurality of fastener recesses provided in said transfer case attachment collar.

8. The adaptor of claim 7 further comprising a first shaft bearing cavity provided in said first end of said adaptor body and a second shaft bearing cavity provided in said second end of said adaptor body.

9. The adaptor of claim 7 wherein said adaptor body comprises a generally cylindrical middle body portion and wherein said transmission case attachment collar is provided on a first end of said middle body portion and said transfer case attachment collar is provided on a second end of said middle body portion.

10. The adaptor of claim 9 further comprising a first shaft bearing cavity defined by said transmission case attachment collar and a second shaft bearing cavity defined by said transfer case attachment collar.

11. The adaptor of claim 9 further comprising a body taper provided on said adaptor body between said middle body portion and said transfer case attachment collar.

12. The adaptor of claim 11 further comprising a first shaft bearing cavity defined by said transmission case attachment collar and a second shaft bearing cavity defined by said transfer case attachment collar.

13. An adaptor for attaching a powerglide transmission case to a four-wheel-drive transfer case, comprising:
    an adaptor body having a continuous shaft bore extending through said adaptor body;
    a transmission case attachment collar provided on a first end of said adaptor body;
    a plurality of fastener openings extending through said transmission case attachment collar;
    a transfer case attachment collar having an outer face provided on a second end of said adaptor body;
    a plurality of closed-ended fastener recesses provided in said outer face of said transfer case attachment collar; and
    wherein said adaptor body, said transmission case attachment collar and said transfer case attachment collar are formed in one piece.

14. The adaptor of claim 13 further comprising a first shaft bearing cavity provided in said first end of said adaptor body and a second shaft bearing cavity provided in said second end of said adaptor body.

15. The adaptor of claim 13 wherein said adaptor body comprises a generally cylindrical middle body portion and wherein said transmission case attachment collar is provided on a first end of said middle body portion and said transfer case attachment collar is provided on a second end of said middle body portion.

16. The adaptor of claim 15 further comprising a first shaft bearing cavity defined by said transmission case attachment collar and a second shaft bearing cavity defined by said transfer case attachment collar.

17. An article of manufacture comprising:
    an adaptor body having a continuous shaft bore extending through said adapter body;
    a transmission case attachment collar provided on a first end of said adaptor body;
    a plurality of fastener openings extending through said transmission case attachment collar;
    a powerglide transmission case carried by said transmission case attachment collar;
    a transfer case attachment collar having an outer face provided on a second end of said adaptor body;
    a plurality of closed-ended, interiorly-threaded fastener recesses provided in said outer face of said transfer case attachment collar;
    a transfer case carried by said transfer case attachment collar; and
    wherein said adaptor body, said transmission case attachment collar and said transfer case attachment collar are formed in one piece.

18. The adaptor of claim 17 further comprising a first shaft bearing cavity provided in said first end of said adaptor body and a second shaft bearing cavity provided in said second end of said adaptor body.

19. The adaptor of claim 17 wherein said adaptor body comprises a generally cylindrical middle body portion and wherein said transmission case attachment collar is provided on a first end of said middle body portion and said transfer case attachment collar is provided on a second end of said middle body portion.

20. The adaptor of claim 19 further comprising a first shaft bearing cavity defined by said transmission case attachment collar and a second shaft bearing cavity defined by said transfer case attachment collar.

* * * * *